United States Patent [19]

Seibert et al.

[11] Patent Number: 4,708,404
[45] Date of Patent: Nov. 24, 1987

[54] HYDRAULIC BRAKE SYSTEM WITH HYDRAULIC BRAKE FORCE BOOSTING

[75] Inventors: Wolfram Seibert, Darmstadt; Norbert Ocvirk, Offenbach; Juergen Schonlau, Niedernhausen, all of Fed. Rep. of Germany

[73] Assignee: Alfred Teves GmbH, Frankfurt am Main, Fed. Rep. of Germany

[21] Appl. No.: 821,619

[22] Filed: Jan. 23, 1986

[30] Foreign Application Priority Data

Jan. 23, 1985 [DE] Fed. Rep. of Germany ....... 3502018

[51] Int. Cl.[4] .......................... B60T 8/44; B60T 11/02; B60T 13/12
[52] U.S. Cl. ..................................... 303/114; 188/345; 188/358; 303/10; 303/92; 303/116; 303/119; 303/52
[58] Field of Search ............... 303/119, 116, 114, 117, 303/13–15, 6 R, 10–12, 92, 100, 110, 6 C, 6 A, DIGS. 1–4, 113, 115, 118, 52, 50; 60/545, 547.1, 554, 582, 549, 563, 591; 188/345, 355–359

[56] References Cited

U.S. PATENT DOCUMENTS

| 4,099,793 | 7/1978 | Iio | 303/119 X |
| 4,404,803 | 9/1983 | Steffers | 303/13 X |
| 4,415,210 | 11/1983 | Belart et al. | 303/116 |
| 4,416,491 | 11/1983 | Belart et al. | 303/52 X |
| 4,482,190 | 11/1984 | Burgdorf et al. | 303/114 X |
| 4,489,989 | 12/1984 | Belart et al. | 303/114 X |
| 4,492,413 | 1/1985 | Belart et al. | 303/119 X |
| 4,530,209 | 7/1985 | Steffes | 303/92 X |
| 4,555,144 | 11/1985 | Belart et al. | 303/119 X |
| 4,565,411 | 1/1986 | Seiber | 303/110 |
| 4,602,824 | 7/1986 | Nishimura et al. | 303/100 |
| 4,643,489 | 2/1987 | Reinartz et al. | 303/114 |

FOREIGN PATENT DOCUMENTS

| 2084275 | 4/1982 | United Kingdom | 303/119 |
| 2148432 | 5/1985 | United Kingdom | 303/119 |
| 2149035 | 6/1985 | United Kingdom | 303/114 |
| 2155131 | 9/1985 | United Kingdom | 303/119 |

Primary Examiner—Douglas C. Butler
Attorney, Agent, or Firm—James B. Raden; Robert P. Seitter

[57] ABSTRACT

A brake system with hydraulic brake force boosting comprises a master cylinder (1), to which the wheel brakes (36 to 39, 36' to 39') are connected, as well as of an auxiliary-pressure supply system (11, 12) and of an auxiliary-pressure control valve (10) which causes an auxiliary pressure proportional to the pedal force (F). Inserted into the pressure fluid conduits from the master cylinder (1) to the wheel brakes (36 and 39, 36' to 39') are pressure-controlled multidirectional valves (15, 15', 16, 16') which, in their initial position, provide for hydraulic communication between the master cylinder (1) and the wheel brakes. After a second switch position has been assumed, the auxiliary-pressure source (11, 12) will be connected to the wheel brakes (36 to 39, 36' to 39'), whereby dynamic braking is effected instead of the master cylinder (1).

4 Claims, 2 Drawing Figures

HYDRAULIC BRAKE SYSTEM WITH HYDRAULIC BRAKE FORCE BOOSTING

BACKGROUND OF THE INVENTION

The present invention relates to a hydraulic brake system equipped with hydraulic brake force boosting. The system is substantially composed of a pedal-actuated master cylinder to which the wheel brakes are connected by way of pressure fluid lines of an auxiliary-pressure supply system, and of an auxiliary-pressure control valve which causes an auxiliary pressure proportional to the pedal force.

A known brake system of this type consists of a single-type or tandem-type master cylinder with a hydraulic brake power booster connected upstream thereof as well as of an auxiliary-pressure supply system comprising a pump and a hydraulic accumulator. The hydraulic booster contains an auxiliary-pressure control valve which, on actuation of the brake pedal, brings about an auxiliary pressure that is proportional to the pedal force and that acts on the pistons in the master cylinder. The boosting factor of the brake system is selected by the ratio of the surfaces of a transmission piston in the interior of the brake power booster in relation to the surface of an actuating piston coupled mechanically to the brake pedal. As the brake circuits are designed as static circuits, the volume of the pressure chambers in the master cylinders must be adapted to the respective brake system.

Furthermore, slip-controlled brake systems are known wherein the hydraulic braking pressure generator is likewise composed of a master cylinder and a hydraulic brake power booster connected upstream thereof, as disclosed in German printed and published patent applications Nos. 30 40 561 and 30 40 562. During slip control, dynamic pressure out of the auxiliary-pressure supply system is introduced by way of the booster chamber into the brake circuits which are connected to the master cylinder and which are static until commencement of slip control. This way, the discharge or pressure fluid into the pressure supply reservoir during the phases of pressure reduction will be compensated. Such systems are rather complicated and costly.

Likewise known are slip-controlled brake systems, the braking pressure generator of which is also composed of a hydraulic brake power booster with a master cylinder connected downstream thereof, and wherein on commencement of slip control dynamic pressure is metered out of the brake power booster directly into the wheel brake cylinders of the wheels connected to the master cylinder. To this end, the wheel brakes connected to the static brake circuit communicate by way of electromagnetically actuatable multidirectional control valves with the master cylinder so that change-over of these valves causes interruption of the hydraulic connection between the master cylinder and the wheel brakes and permits connection of the auxiliary-pressure source instead of the master cylinder. During normal braking operations (i.e., without slip control) or until change-over of the solenoid valves, respectively, the circuits concerned are strictly static brake circuits.

It is an object of the present invention to develop a brake system with hydraulic boosting which is comparatively simple and entails little effort and which system likewise permits to be extended to a slip-controlled brake system by insertion of electromagnetically controllable inlet and outlet valves and by equipment with a measuring and control electronics.

SUMMARY OF THE INVENTION

This object is achieved in a technically advanced fashion by a hydraulic brake system of the type referred to wherein pressure-controlled multidirectional valves are inserted into the pressure-fluid conduits from the braking pressure generator to the wheel brakes, which valves, in their inactive or initial position, provide hydraulic connection between the master cylinder and the wheel brakes and which, after change-over into a second switch position, will connect the auxiliary-pressure source, instead of the master cylinder, to the pressure-fluid conduits leading to the wheel brakes.

That is, in the normal case (i.e., when the auxiliary-pressure supply system is intact) the brake system of the present invention provides for strictly dynamic braking. The master cylinder serves but to control the auxiliary-pressure control valve and to safeguard the brakes's function upon the occurrence of a defect and, more specifically, in the event of a malfunction in the auxiliary pressure source. The design of the system is extremely straightforward, since essentially there is only need for a master cylinder, a pressure-controlled auxiliary-pressure control valve, a hydraulic pump and some pressure-controlled multidirectional valves. Such valves are reliable in operation and allow low manufacturing cost, in particular in comparison to electromagnetically actuatable valves.

Since the master cylinder substantially serves to control the brake system only and there is dynamic braking normally, one size of master cylinder can be utilized for differently dimensioned brake systems. As another advantage, the inventive brake system can be used as a hydraulic unit of a slip-controlled brake system, because there already is dynamic braking in the normal case of braking and, therefore, the hydraulic medium discharged in the phase of pressure reduction can be refurnished by the auxiliary-pressure supply system. Hence there is no need for so-called main valves for the dynamic supply of pressure fluid into the static circuits, as they are required in known brake slip control systems.

According to a further embodiment of the present invention, a three-way/two-position directional control valve is provided in each brake circuit as a pressure-controlled multidirectional valve which can be switched over by the controlled auxiliary pressure. Additionally, a second pressure-controlled multidirectional valve can be inserted into each brake circuit in the pressure-fluid conduit leading from the controlled auxiliary pressure or the auxiliary pressure source to the control port of the pressure-controlled multidirectional valve and to the auxiliary-pressure inlet of this valve, the second multidirectional valve closing in the inactive or initial position and being switchable to open by the action of the pressure developing in the respective circuit in the master cylinder when the brakes are applied.

Furthermore, another embodiment of the present invention is arranged to connect the control inlet of the auxiliary-pressure control valve to a pressure chamber in the master cylinder in which there develops a pressure proportional to the pedal force. Further, the master cylinder is provided as a tandem-type master cylinder which is in communication with a control valve comprising two hydraulically isolated control chambers which are connected each to one of the two pressure chambers of the tandem master cylinder. On failure of one hydraulic circuit, the control valve will be controlled by the braking pressure in the pressure chamber of the intact circuit of the tandem master cylinder.

According to a further embodiment of the inventive brake system, the auxiliary-pressure supply system contains an electromotively driven hydraulic pump, the drive motor of which can be switched on when the pedal is depressed. In still another embodiment, the inventive brake system advantageously disposes of a pedal travel simulator inserted downstream and admitting a displacement of the master cylinder piston proportional to the pedal force. Since the master cylinder solely controls the pressure control valve, a pedal travel is not required.

According to another embodiment of this invention, the pedal travel simulator starts to function only after rise of the pressure in the auxiliary-pressure source in excess of a predetermined threshold value or, respectively, in the event of introduction of auxiliary pressure with the aid of the control valve. When the auxiliary-pressure supply system is defective, the pedal travel simulator is adapted to be locked.

Suitably, the pedal travel simulator is essentially composed of a compression spring which is accommodated in a chamber inside the master cylinder and which is compressible by axial displacement of the master cylinder piston in the direction of the pedal force. The chamber is in communication with a pressure supply reservoir by way of a pressure-controlled two-way/two-position directional valve which is closed in the inactive position and which is switchable to open by virtue of the auxiliary pressure.

BRIEF DESCRIPTION OF THE DRAWINGS

Further features, advantages and application of this invention will be appreciated from the following description of an embodiment of this invention with reference to the accompanying drawings wherein.

DETAILED DESCRIPTION

Figure 1:
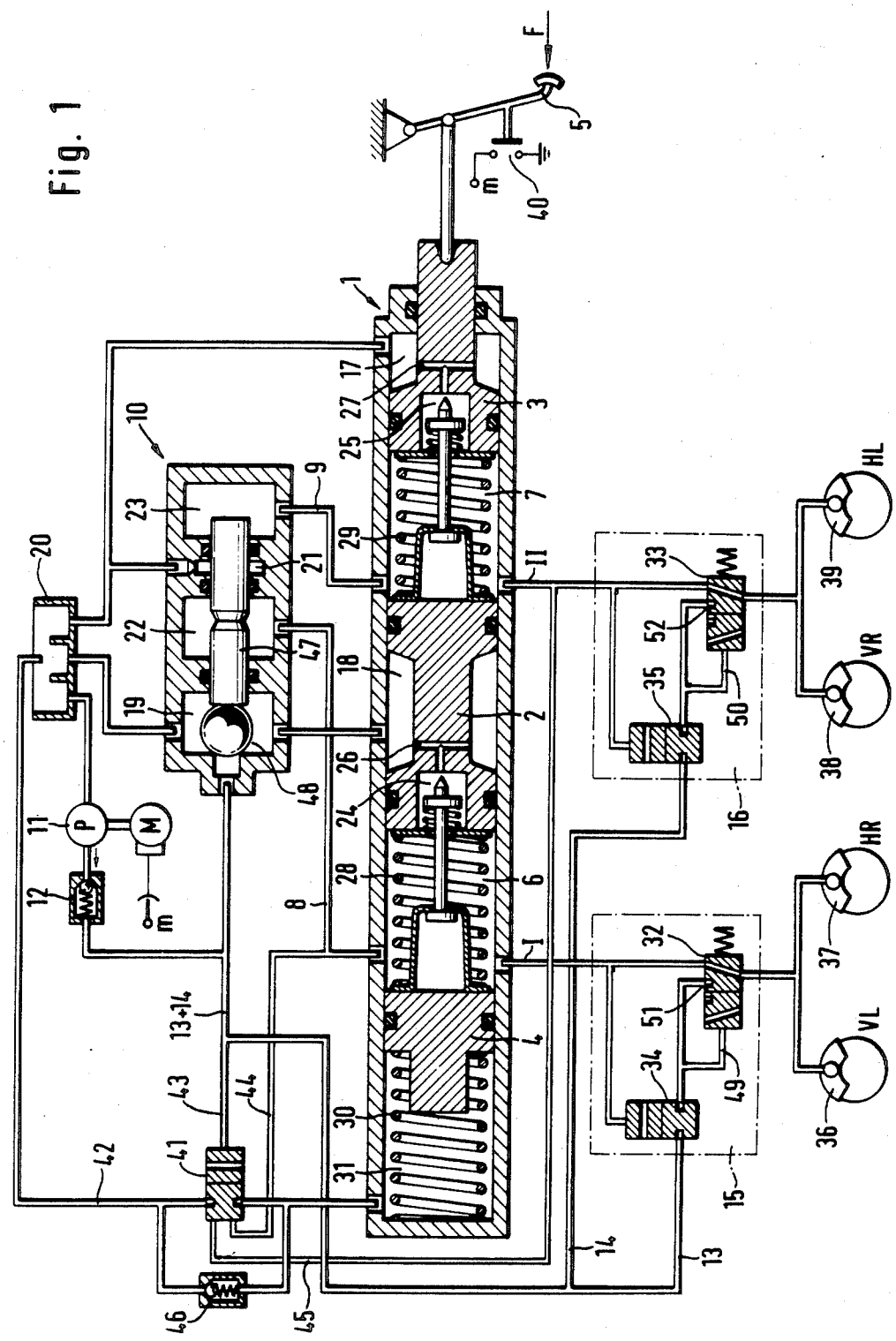
FIG. 1 is a schematically simplified view of the principal component parts and of the hydraulic circuit configuration of a brake system in accordance with the present invention; and, FIG. 2 is a schematic diagram similar to FIG. 1 which illustrates a slip-controlled brake system according to the present invention.

In the embodiment shown in FIG. 1, the braking pressure generator employed by the brake system is a tandem master cylinder 1, whose pistons 2 to 4 are acted upon directly, that means without boosting of pedal force or brake force by the brake force F that is exerted by way of a brake pedal 5 and symbolized by an arrow. Usually, piston 2 is referred to as intermediate piston, while piston 3 is termed as push-rod piston. The third master cylinder piston 4 belongs to a pedal travel simulator inserted downstream, the details and mode of function of which will be described hereinbelow. An auxiliary-pressure control valve 10 is connected to the two working or pressure chambers 6, 7 of the tandem master cylinder 1 via pressure fluid lines 8,9.

The arrangement illustrated is equipped with an auxiliary-pressure supply system. The latter comprises as an essential component part an electromotively driven hydraulic pump 11, the pressure side of which is connected by way of the associated on-return valve 12 with the auxiliary-pressure control valve 10 and by way of the hydraulic connecting lines 13, 14 with the pressure-controlled multidirectional valves 15, 16 which will be explained in more detail in the following. The suction side of the hydraulic pump 11 as well as a pedal-side annular chamber 17 at the push rod piston 3 of the master cylinder 1, a comparable chamber 18 at the intermediate piston 2 and a compensating chamber 19 in the control valve 10 are in communication with a pressure-compensating and supply reservoir 20. Finally, an annular chamber 21 is still connected to this reservoir 20, the said chamber being arranged between two ring seals which hydraulically isolate two control chambers 22 and 23 of the control valve 10.

The pressure chambers 6, 7 of the tandem master cylinder 1 are connected in a known manner by way of central valves 24, 25 and channels 26, 27 with the annular chambers 17, 18 and by way of these with the pressure-compensating reservoir 20 as long as no brake force F is exerted on the pedal 5. Resetting springs 28, 29, 30 which return the pistons 2 to 4 in the interior of the master cylinder 1 to their initial position illustrated when the brake pedal 5 is released are disposed in the pressure chambers 6 and 7 as well as in a chamber 31 pertaining to the pedal travel simulator.

The pressure-controlled multidirectional valve 15, 16 allocated to the two static brake circuits I, II in the embodiment of the invention described herein each consist of two separate valves, namely of a pressure-controlled three-way/two-position directional valve 32, 33 and a pressure-controlled two-way/two-position direction valve 34, 35. In the inactive or the initial position which is illustrated, that is when the brake is not applied, the working or pressure chambers 6, 7 of the tandem master cylinder 1 communicate by way of the respective three-way/two-position directional valve 32 or 33 with the wheel brakes 36, 37 and 38, 39, respectively. The pressure fluid lines 13, 14 leading to the auxiliary-pressure supply system and, respectively, to the pump 11 and the control valve 10 are interrupted by the two-way/two-position directional valves 34, 35 as long as the brakes are not applied.

The drive motor M first is not in operation, since the switch 40 will not close until depression of the pedal 5 and sets the motor M of the pump 11 by way of the contact m into function. The pedal travel simulator, which is substantially composed of the simulator piston 4, the compression spring 30 and a pressure-controlled two-way/two-piston directional valve 41, will be locked in consequence of the return line 42 being shut off by the valve 41, as long as the auxiliary pressure which can be transmitted by way of the pressure fluid line 43 is equal to, or less than, the pressure prevailing on the opposite side of valve 41. That is, because the pressure transmitted by way of control lines 44 and 45, which are connected to the pressure chambers 6, 7 in the master cylinder 1, is opposed to the auxiliary pressure transmitted by way of the line 43 in terms of its effect on the switch position valve 41.

In another embodiment of the invention (not illustrated) the connecting lines 44, 45 are deleted so that the valve will be switched over to its opened condition in opposition to a resetting spring (not shown) as soon as the auxiliary pressure exceeds a predetermined threshold value.

A non-return valve 46 which is connected in parallel to the valve 41 and which can be unitized with the valve ensures that, then the brake is released, the simulator piston 4 is allowed to slide back to its initial position under the pressure of the resetting spring 30, even after the valve 41 having been switched back to its closed position shown.

The mode of operation of the brake system illustrated is as follows:

On depression of the brake pedal, the master cylinder pistons 2, 3 are displaced to the left. The central valves 24, 25 will close so that pressure is subsequently allowed to develop in the pressure chambers 6, 7. Simultaneously, the hydraulic pump 11 is put into operation by closing of the switch 40.

A pressure proportional to the brake force F is transmitted by way of the hydraulic control line 9 into the control chamber 23 of the auxiliary-pressure control valve 10, whereupon pressure is exerted in the direction of closing of the spherical seat valve 48, which is a component part of the control valve, through the control piston 47 of the control valve 10. Now, auxiliary pressure can develop in the pressure fluid cycle of the hydraulic pump 11, the auxiliary pressure being thus proportional to the pressure in the control chamber 23, to that in the pressure chamber 7 and to the pedal force F.

The pressure caused by the braking action in the brake circuits I, II moreover has as a result change-over of the pressure-controlled two-way/two-position directional valves 34 and 35, so that now the auxiliary pressure also prevails at the control inlets 49, 50 and at the pressure fluid inlets 51, 52 of the three-way/two-position directional valves 32, 33. This has as a consequence that, after the valves 32, 33 have been changed over, the auxiliary pressure source, instead of the tandem master cylinder 1 or the pressure chambers 6, 7 of this master cylinder, will be connected to the wheel brakes 36, 37, 38, 39. The pressure fluid volumes of the pressure chambers 6, 7 in the interior of the master cylinder 1 remain almost constant even in the event of the pedal force F continuing to increase. However, the brake pedal 5 is able to perform a travel proportional to the pedal force F because meanwhile the auxiliary pressure has exceeded the pressure in the chambers 6, 7 and, thereby the two-way/two-position directional valve 41 of the pedal travel simulator has switched to open. Therefore, the chamber 31 of the pedal travel simulator is in connection with the pressure-compensating reservoir 20 so that the driver of the vehicle feels the resetting force of the spring 30 at the pedal 5.

Upon the occurence of a pump defect or any other defect from which ensures pressure failure in the auxiliary-pressure supply system, the pressure-controlled valves 32, 33 will remain in their inactive position. As a result, the master cylinder 1 will perform its original task and transmit the pedal pressure onto the wheel brake cylinders 36 to 39, however, without brake power boosting. The pedal travel simulator remains locked in this situation.

Upon failure of one brake circuit I or II, for instance due to leakage, the associated pressure-controlled two-way/two-position directional valve 34 or 35 remains closed so that no pressure fluid loss may occur. However, dynamic braking is continued in the intact brake circuit II or I by change-over of the pressure-controlled multidirectional valves 33, 35 and, respectively, 32, 34 with the aid of the pressure introduced from the auxiliary-pressure supply system.

On pressure failure in the brake circuit II, the actuation of the auxiliary-pressure control valve 10 by way of the control line 8 and the control chamber 22 is taken care of by the pressure in the pressure chamber 6.

Figure 2:
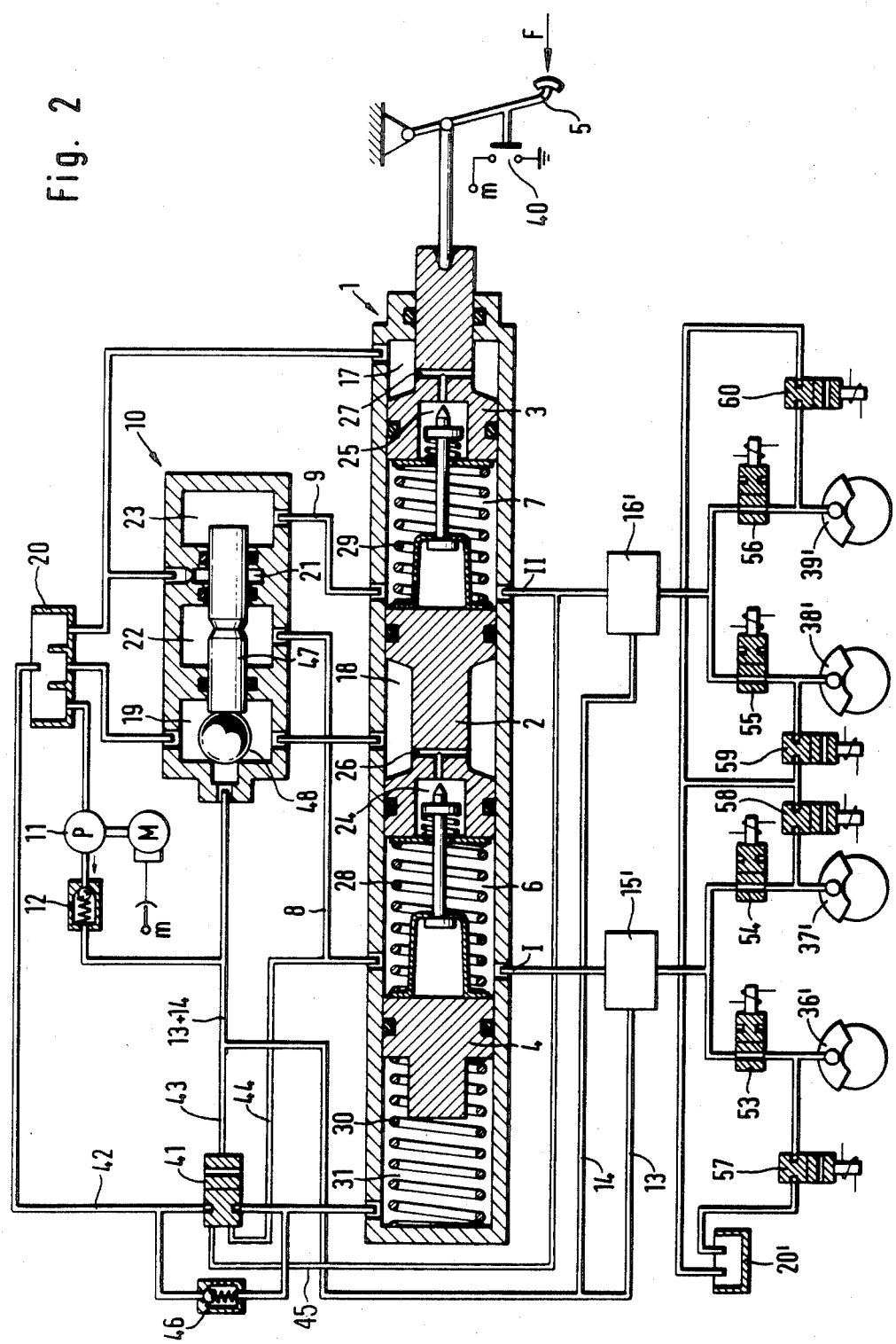

In the embodiment according to FIG. 2, the hydraulic brake system described in additionally equipped with electromagnetically actuatable valves 53 to 60, which prevent locking of the wheels by way of limiting the slip of the individual wheels in dependence on pickups (not shown) for measuring data and electronic control circuits and by controlling the wheel slip to adopt an optimum value. To this end, in the embodiment shown, the pressure fluid conduits to the individual wheel brakes 36' to 39' contain so-called inlet valves 53, 54, 55 and 56 which normally adopt their opened position and which can be switched over electromagnetically to close in the phase of maintaining the pressure constant or in the phase of pressure reduction. For the purpose of pressure reduction, the outlet valves 57 to 60 are required which allow discharge of pressure fluid in a dosed quantity to the compensating reservoir 20' in the presence of excessive braking pressure.

In contrast to known slip-controlled brake systems, the discharge of hydraulic medium into the compensating reservoir 20 and 20', respectively, for the purpose of decreasing the braking pressure at the wheel brake of the wheel tending to lock does not incur any difficulties. Due to the change-over to the auxiliary-pressure supply system which takes place during every braking operation anyway and due to the closing of the pressure fluid conduit to the master cylinder 1, the pressure in the wheel brakes 36' to 39' can be re-increased directly by renewed switching the inlet valves 53 to 56 back to their opened condition. The pressure fluid enclosed in the pressure chambers 6, 7 in the master cylinder 1 during braking is available as a reserve and enables an emergency braking, that means braking without boosting of the brake force, upon a possible failure of the auxiliary-pressure supply system and disconnection of the slip control.

What is claimed is:

1. A brake system with brake force boosting for a slip-controlled automotive vehicle having vehicle wheels and wheel brakes, said system comprising, in combination:
    a tandem master cylinder having two pressure chambers therein;
    an auxiliary-pressure control valve having first and second chambers therein respectively connected to said two pressure chambers of said master cylinder by way of pressure fluid lines and said control valve having a compensating chamber therein;
    first and second multidirectional valves respectively connected by way of pressure fluid lines between said two chambers of said master cylinder and a selected pair of said wheel brakes, each multidirectional valve including a first pressure-controlled multidirectional valve respectively connected in the pressure line between one of said two pressure chambers of said master cylinder and one of said pair of wheel brakes, and a second pressure-controlled multidirectional valve respectively connected in the pressure line between said compensating chamber and one of said pair of wheel brakes;
    an auxiliary-pressure supply including a hydraulic pump having an input, said hydraulic pump being connected to said compensating chamber and said multidirectional valves by way of pressure fluid lines;

a first pressure-compensating and supply reservoir connected to said input of said hydraulic pump and to said compensating chamber by way of pressure fluid lines;

a plurality of electromagnetically actuated normally open inlet valves respectively connected in one of said pressure fluid lines between each wheel brake and one of said first and second multidirectional valves, wherein each inlet valve is switched to its closed position in response to a slip-control signal;

a second plurality of electromagnetically actuated normally closed outlet valves respectively connected between each wheel brake and one of said first reservoir and a second compensating reservoir, wherein each outlet valve is switched to its open position in response to a slip-control signal.

2. The brake system according to claim 1, wherein said first pressure-controlled valve is a three-way/two-position directional valve and wherein said second pressure-controlled valve is a two-way/two-position valve.

3. The brake system according to claim 1, wherein said hydraulic pump is an electromotively driven drive motor which is actuated by a brake foot pedal switch.

4. The brake system according to claim 3, wherein said master cylinder includes a pedal travel simulator comprising a piston slidably mounted in the one of said two chambers of said master cylinder at the downstream end portion thereof, a compression spring located between said piston and the downstream end of said master cylinder, and a third pressure-controlled directional valve connected between a chamber surrounding said compression spring and said first reservoir, wherein said third pressure-controlled directional valve opens when the pressure in said auxiliary-pressure supply exceeds the pressure in said two chambers of said master cylinder.

* * * * *